United States Patent Office 3,219,649
Patented Nov. 23, 1965

3,219,649
PROCESS AND CATALYST FOR PRODUCTION OF OLEFIN POLYMERS
Gene Nowlin and Harold D. Lyons, Bartlesville, Okla., assignors to Phillips Petroleum Company, a corporation of Delaware
No Drawing. Filed July 11, 1955, Ser. No. 521,367
13 Claims. (Cl. 260—93.7)

This invention relates to the polymerization of olefins. In one aspect, this invention relates to an improved method for polymerizing olefins and to a novel catalyst therefor.

Reactions for polymerizing olefins are well known in the art and are generally carried out in the presence of catalysts. One class of catalysts which has been used in the polymerization of monoolefins, particularly ethylene, is organometal compounds, for example triethylaluminum, and the polymers which have been obtained in accordance with this method are generally liquid or low molecular weight solid polymers. Frequently, the polymers obtained are dimers or trimers of the olefin charged. However, it is often desirable to produce higher molecular weight polymers which have desirable properties of heat stability and can be molded into vessels, pipes and tubing. Such uses cannot be made of the lower molecular weight polymers, for example, a polymer having a molecular weight of about 2000, since a polymer of this molecular weight is a wax-like material.

An object of this invention, therefore, is to provide an improved process for the production of olefin polymers.

A further object is to provide a novel catalyst for use in the production of olefin polymers.

A still further object is to produce high molecular weight solid polymers of olefins, such as ethylene.

Other and further objects and advantages of this invention will become apparent to those skilled in the art upon consideration of the accompanying disclosure.

It has now been discovered that an unexpected improvement in the production of high molecular weight polymer is obtained when an olefin, such as ethylene, is polymerized in the presence of a catalyst composition comprising a derivative of a metal of Group IV–A of the periodic table (Mendeléeff's Periodic System), including titanium, zirconium, hafnium and thorium, selected from the group consisting of (1) compounds corresponding to the formula $X_nM(OR)_m$, (2) compounds corresponding to the formula $M_a[(OCH_2CH_2)_aNH_{(3-a)}]_b$, (3) salts of monobasic organic acids and a Group IV–A metal, and (4) complex salts of dibasic organic acids and at least one Group IV–A metal and at least one selected from the group consisting of alkali metals and ammonia, wherein X is a halogen, and M is a Group IV–A metal, R is selected from the group consisting of R" and R"', where R" is selected from the group consisting of saturated acyclic (alkyl), monoolefinic acyclic (alkenyl), saturated cyclic (cycloalkyl), monoolefinic cyclic (cycloalkenyl), aromatic (aryl), and combinations of two or more of these radicals. Examples of, but not exhaustive of, such combinations are alkaryl, aralkyl, alkarylalkyl, alkylcycloalkyl, arylalkenyl, cycloalkylalkenyl, cycloalkylalkyl, alkenylaryl, and alkenylcycloalkyl. R"' is selected from the group consisting of (a) R" radicals which are halogen substituted, (b) R" radicals which contain oxygen, and (c) R" radicals which are halogen substituted and contain oxygen, said oxygen being present in the form of an ether linkage. Each R contains not more than 20 carbon atoms, preferably less than 10 carbon atoms, with the total carbon atoms in the compound not exceeding 50, $m$ and $n$ are whole numbers, with $m$ being at least 1 and not greater than the valence of the Group IV–A metal and with the sum of $m$ and $n$ being equal to the valence of the Group IV–A metal, $a$ is an integer from 1 to 3, inclusive, and $b$ is equal to the valence of the Group IV–A metal and an organometal halide corresponding to the formula $R'_xM'X'_y$ wherein R' is a saturated acyclic hydrocarbon radical, a saturated cyclic hydrocarbon radical, an aromatic hydrocarbon radical, or any combination of these radicals, M' is a metal selected from the group consisting of aluminum, gallium, indium, thallium, and beryllium, X' is a halogen, and $x$ and $y$ are integers, the sum of $x$ and $y$ being equal to the valence of the metal. As indicated, the catalyst composition of this invention comprises a derivative of a Group IV–A metal as described hereinabove together with an organometal halide corresponding to the formula $R'_xM'X'_y$. The improvement obtained when polymerizing an olefin in the presence of our catalyst system is, firstly, that polymers of much higher molecular weight can be obtained than is true when certain of the prior art catalysts have been employed, and, secondly, the polymerization reaction, particularly for ethylene, can be initiated and carried out at considerably lower temperatures and pressures than are necessary when employing the catalysts and the processes of the prior art.

The Group IV–A metal derivative component of our catalyst system comprises at least one compound selected from the group consisting of salts of monobasic organic acids and a Group IV–A metal, complex salts of dibasic organic acids and at least one Group IV–A metal and at least one member selected from the group consisting of alkali metals and ammonia, complex compounds of a Group IV–A metal corresponding to the formula $X_nM(OR)_m$, and complex compounds of a Group IV–A metal corresponding to the formula $$M_a[(OCH_2CH_2)_aNH_{(3-a)}]_b$$

wherein X is a halogen, wherein M is a metal selected from the group consisting of titanium, zirconium, hafnium and thorium, wherein R is selected from the group consisting of R" and R"', where R" is selected from the group consisting of saturated acyclic (alkyl), monoolefinic acyclic (alkenyl) saturated cyclic (cycloalkyl), monoolefinic cyclic (cycloalkenyl), aromatic (aryl), and combinations of two or more of these radicals. Examples of, but not exhaustive of, such combinations are alkaryl, aralkyl, alkarylalkyl, alkylcycloalkyl, arylalkenyl, cycloalkylalkenyl, cycloalkylalkyl, alkenylaryl, and alkenylcycloalkyl. R"' is selected from the group consisting of (a) R" radicals which are halogen substituted, (b) R" radicals which contain oxygen, and (c) R" radicals which are halogen substituted and contain oxygen, said oxygen being present in the form of an ether linkage, wherein $m$ and $n$ are whole numbers, with $m$ being at least 1 and not greater than the valence of the metal and with the sum of $m$ and $n$ being equal to the valence of M, and wherein $a$ is an integer from 1 to 3, inclusive, and $b$ is equal to the valence of M. Each R contains not more than 20 carbon atoms, preferably less than 10 carbon atoms, with the total number of carbon atoms in the complex compound not exceeding 50. The expression "Group IV–A metal" as used herein is intended to include titanium, zirconium, hafnium and thorium. X and the halogen contained in the R radical can be any of the halogens, including bromine, chlorine, fluorine and iodine. Mixtures of any two of more of these derivatives can be used in the practice of our invention. Salts of monobasic organic acids and a Group IV–A metal which can be used include such compounds as titanium acetate, zirconium propionate, titanium butyrate, and the like. Complex salts of dibasic organic acids and at least one Group IV–A metal and at least one of the group consisting of alkali metals and ammonia can also be advantageously employed in our catalyst system. Examples of such compounds are sodium titanium malonate ($Na_2TiO(C_3H_2O_4)_2$), potassium titanium oxalate the complex salt of oxalic acid and titanium and potassium ($K_2TiO(C_2O_4)_2$), and the like. Of the latter group of compounds potassium titanium oxalate is the compound which is preferred for use in the catalyst system of our invention. Although numerous derivatives fall within the scope of the class of complex compounds corresponding to the formula $X_nM(OR)_m$, the preferred derivatives include titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra(chloroethyl)titanate, tetra-m-tolyl titanate, tetraallyl titanate, tetracyclohexenyl titanate, tetracyclopentyl titanate, tetraethyl zirconate, tetramethyl zirconate, tetraisopropyl zirconate, tetraamyl zirconate, dichloro diethyl titanate ($Cl_2Ti(OC_2H_5)_2$), monochlorotriethyl titanate ($ClTi(OC_2H_5)_3$), and dichlorodiethyl zirconate ($Cl_2Zr(OC_2H_5)_2$). Also included are such compounds as $Hf(OCH_3)_4$, $Th(OC_3H_7)_4$, $Th(OC_6H_5)_4$,
$Cl_3Ti(OC_6H_4CH_3)$, $Zr(OC_4H_7)_4$, $Cl_2Hf(OC_{10}H_{21})_2$,
$Th(OC_6H_{13})_4$, and $Zr(OC_{12}H_{25})_4$.

Of the complex compounds listed in the above group, titanium butoxide ($Ti(OC_4H_9)_4$) is preferred for use in our catalyst system since the use of this material as a catalyst in the polymerization of ethylene provides a high molecular weight, extremely flexible and tough polymer which can be molded into a variety of shapes and forms. This ethylene polymer does not have a tendency to become discolored on injection or extrusion molding and is, therefore, useful in a large variety of applications. The surface of the molded articles formed from a polyethylene prepared in the presence of the preferred catalyst titanium butoxide is very smooth and pleasing to the touch. Examples of complex compounds corresponding to the formula $Ma[(OCH_2CH_2)_aNH_{(3-a)}]_b$ which can be employed in our catalyst system include monoethanolamine titanate, diethanolamine titanate, triethanolamine titanate, monoethanolamine zirconate, diethanolamine zirconate, triethanolamine zirconate, monoethanolamine thoriate, and the like. Of this latter group of compounds, it is preferred to use triethanolamine titanate in the catalyst system of our invention. The Group IV–A metal derivatives listed hereinabove are preferably employed in the anhydrous or substantially anhydrous form.

Our catalyst system comprises a mixture of one or more of the Group IV–A metal derivatives set forth above and at least one organometal halide corresponding to the formula $R'_xM'X'_y$ wherein $R'$ is a saturated acyclic hydrocarbon radical, a saturated cyclic hydrocarbon radical, an aromatic hydrocarbon radical, or mixtures of these radicals, wherein $M'$ is a metal selected from the group consisting of aluminum, gallium, indium, thallium and beryllium, and wherein $X'$ is a halogen. The $x$ and $y$ are integers and the sum of $x$ and $y$ is equal to the valence of the metal $M'$. $X'$ can be any of the halogens, including chlorine, bromine, iodine and fluorine. The saturated acyclic hydrocarbon radicals, saturated cyclic hydrocarbon radicals, and aromatic hydrocarbon radicals which can be substituted for $R'$ in the formula include hydrocarbon radicals having up to about 20 carbon atoms each. Radicals having 10 carbon atoms or less are preferred since the resulting catalyst composition has a greater activity for initiating the polymerization of olefins. Mixtures of one or more of these organometal halide components, such as a mixture of ethylaluminum dichloride and diethylaluminum chloride, can be used in our catalyst composition. Specific examples of other organometal halides which are useful in the catalyst composition of this invention are the following:

$CH_3AlCl_2$, $(CH_3)_2AlCl$, $C_2H_5AlCl_2$, $(C_2H_5)_2AlCl$,
$(C_4H_9)_2AlBr$, $C_8H_{17}AlI_2$, $(C_3H_7)_2GaF$, $(C_6H_{11})_2GaCl$
(cyclohexane derivative) $(C_6H_5)GaBr_2$ (benzene derivative), $C_{20}H_{41}GaBr_2$, $(C_{14}H_{29})_2GaF$, $(C_6H_5)_2InCl$ (benzene derivative), $C_8H_{17}InF_2$, $(C_6H_{11})InBr_2$ (cyclohexane derivative), $C_{17}H_{35}BeI$, $CH_3BeBr$ and the like.

As has been indicated, an organometal halide corresponding to the formula $R'_xM'X'_y$ together with one or more of the Group IV–A metal derivatives described above are used in the catalyst composition of this invention. The catalyst compositions falling within the scope of this disclosure which are preferred because their use to catalyze the polymerization of olefins provides relatively high molecular polymers and/or permits the use of relatively low reaction temperatures and pressures are the following: a mixture of titanium butoxide with an approximately equimolar mixture of ethylaluminum dichloride and diethylaluminum chloride; and a mixture of triethanolamine titanate with an approximately equimolar mixture of ethylaluminum dichloride and diethylaluminum chloride.

The amount of the catalyst composition of this invention which is used in the polymerization of olefins can vary over a wide range. Relatively small amounts of the catalyst provide the desired activating effect when the polymerization reaction is carried out as a batch process with continuous addition of the olefin as the polymerization reaction occurs. When a continuous flow system is employed, the concentration of the total catalyst composition is usually in the range from 0.01 weight percent to 1.0 weight percent, or higher.

The ratio of organometal halide to Group IV–A metal derivative will be in the range of 0.05 to 50, preferably 0.1 to 5, mols of organometal halide per mol of Group IV–A metal derivative.

The materials which are polymerized in accordance with this invention are polymerizable hydrocarbons, broadly. Preferably, the polymerizable hydrocarbons are olefins containing a $CH_2=C<$ radical. The preferred class of polymerizable hydrocarbons used is aliphatic 1-olefins having up to and including 8 carbon atoms per molecule. Specifically, the normal 1-olefin, ethylene, has been found to polymerize to a polymer thereof upon being contacted with the catalyst composition of this invention at lower temperatures and pressures than have been used in the processes of the prior art mentioned above. Examples of other polymerizable hydrocarbons which can be used in the process of this invention are propylene, 1-butene, 1-hexene and 1-octene. Branched chain olefins can also be used, such as isobutylene. Also, 1,1-dialkyl-substituted and 1,2-dialkyl-substituted ethylenes can be used, such as butene-2, pentene-2, hexene-2, heptene-3, 2-methyl-butene-1, 2-methyl-hexene-1, 2-ethylheptene-1, and the like. Examples of the di- and polyolefins in which the double bonds are in non-conjugated positions and which can be used in accordance with this invention are 1,5-hexadiene, 1,4-pentadiene and 1,4,7-octatriene. Cyclic olefins can also be used, such as cyclohexene. Mixtures of the foregoing polymerizable hydrocarbons can be polymerized to a solid polymer in the presence of our novel catalyst as, for example, by copolymerizing ethylene and propylene, ethylene and 1-butene, ethylene and 1-hexene, propylene and 1-butene, or propylene and a pentene. Also, aryl olefins, e.g., styrene and alkyl-substituted styrenes can be polymerized to a solid polymer in the process of this invention.

One of the important advantages obtained in the polymerization of olefins in the presence of our novel catalyst is that lower temperatures and pressures can be used than in certain of the prior art processes. The temperature can be varied over a rather broad range, however, such as from zero to 500° F. The preferred temperature range is from 100 to 350° F. Although pressures ranging from atmospheric up to 30,000 p.s.i.g. or higher can be employed, a pressure in the range of 100 to 1000 p.s.i.g. is usually preferred.

In this connection, it is noted that it is preferred to carry out the reaction in the presence of an inert, organic hydrocarbon diluent with a pressure sufficient to maintain the diluent in the liquid phase, giving rise to a so-called "mixed-phase" system. However, the polymerization process of this invention proceeds in the gaseous phase without a diluent. The preferred pressure range set forth above has been found to produce solid polymers of olefins in excellent yields.

Suitable diluents for use in the polymerization processs are paraffins, halogenated paraffins, cycloparaffins and/or aromatic hydrocarbons which are relatively inert, non-deleterious and liquid under the conditions of the process. The lower molecular weight alkanes, such as propane, butane, and pentane can be used as well as the higher molecular weight paraffins and cycloparaffins, such as isooctane, cyclohexane and methylcyclohexane. Halogenated aromatics, such as chlorobenzene, and aromatic diluents can also be used, such as benzene, toluene, and the like, particularly when operating at higher temperatures. Mixtures of any two or more of these diluents can also be used.

The process of this invention can be carried out as a batch process by pressuring the olefin into a reactor containing the catalyst and diluent, if the latter is used. Also, the process can be carried out continuously by maintaining the above-described concentrations of reactants in the reactor for a suitable residence time. The residence time used in a continuous process can vary widely, since it depends to a great extent upon the temperature at which the process is carried out. The residence time also varies with the specific olefin that is polymerized. However, the residence time for the polymerization of aliphatic monoolefins, within the preferred temperature range of 100 to 350° F., falls within the range of one second to an hour or more. In the batch process, the time for the reaction can vary widely also, such as up to 24 hours or more.

Various materials are known to be poisons for the catalyst composition of this invention. These materials include carbon dioxide, oxygen and water. Therefore, it is usually desirable to free the polymerizable hydrocarbon from these materials, as well as from other materials which tend to inactivate the catalyst before contacting the hydrocarbon with the catalyst. Any of the known means for removing such contaminants can be employed. When a diluent is used in the process, this material should be freed of contaminants, such as water, oxygen, and the like. It is desirable also that air and moisture be removed from the reaction vessel before the reaction is carried out.

At the completion of the polymerization reaction, when a batch process is used, the reactor is cooled to about room temperature, any excess olefin is vented, and the contents of the reactor, including the solid polymer swollen with diluent, is removed from the reactor. The total reactor effluent is then treated to inactivate the catalyst, as by washing with an alcohol. The alcohol-washing step is preferably carried out in a comminution zone, such as a Waring Blendor, so that a finely-divided polymer is thereby provided. The polymer is then separated from the alcohol and diluent by decantation or filtration after which the polymer is dried. When the process of the invention is carried out continuously, the total effluent from the reactor, including polymer, diluent and catalyst system is pumped from the reactor as a slurry to a catalyst-inactivating zone where the reactor effluent is cooled and contacted with a suitable catalyst-inactivating material, such as an alcohol. As in the batch process, it is desirable that the alcohol-treatment step be carried out in a comminution zone so that a finely divided polymer is thereby produced. The diluent and alcohol are then separated from the polymer, for example by filtration and the polymer is then dried. The diluent and alcohol can be separated, for example by fractional distillation, and reused in the process.

EXAMPLE I

Ethylene was polymerized in a 2700 cubic centimeter stainless steel rocking autoclave in the presence of a catalyst consisting of 2 grams of titanium butoxide $$[Ti(OC_4H_9)_4]$$

and 3 cubic centimeters of a mixture of diethylaluminum chloride and ethylaluminum dichloride. This latter mixture was prepared according to the procedure described hereinbelow. The autoclave was charged with 500 cubic centimeters of benzene (dried over sodium and distilled) prior to the addition of the catalyst components. The reactor was flushed with nitrogen prior to and during the charging procedure to prevent contact of the catalyst with air or moisture. The ethylene feed was passed through a purification system to remove oxygen, carbon dioxide, and water vapor prior to entering the reactor. The purification system comprised a pyrogallol solution, a sodium hydroxide solution and drying agents.

Ethylene was added to the reactor containing the catalyst and benzene until a pressure of 300 p.s.i.g. was reached, with the autoclave and contents at a temperature of approximately 88° F. The reactor was then heated gradually and at the end of about 22 minutes the temperature was 120° F. and the pressure was approximately 325 p.s.i.g. This small rise in pressure with the indicated increase in temperature indicated that the polymerization of the ethylene had been initiated at some point prior to the end of the 22-minute reaction period. Heating was continued for an additional 23 minutes and at the end of this period the temperature was 175° F. and the pressure was 265 p.s.i.g. Four minutes later the temperature had increased to 185° F. and the pressure in the reactor was still dropping. At this point heating was discontinued and the reactor was repressured to about 300 p.s.i.g. After an additional 15 minutes, the temperature was about 200° F. and the pressure had dropped to about 265 p.s.i.g. The reactor was repressured to about 300 p.s.i.g. and polymerization continued for an additional 1 hour and 56 minutes. During this latter period the reactor was repressured with ethylene on three different occasions in the same manner as indicated above. At the end of the reaction period the temperature was 172° F. and pressure was about 200 p.s.i.g. At this point unreacted ethylene was bled from the reactor and the vessel was cooled to room temperature with water. When the reactor was opened it was found to be filled (loosely packed) with polyethylene, which was white to light brown in color. It had absorbed or dissolved the benzene diluent charged initially. The polymer was very tough and yet flexible. When it was ground in a Waring Blendor (stainless steel with large size blade), using methyl alcohol as a dispersing medium the polymer shredded but did not become powdery in nature. The solid shredded polymer was separated from the liquid by filtration and was subsequently dried in a vacuum oven at about 172° F. and a pressure of less than 10 mm. of mercury absolute. Approximately 143 grams of dry polymer was obtained.

The physical properties of a compression molded sample of this ethylene polymer are presented in Table I.

Table I

Melting point, ° F. _____ 251±3.
Density, grams/cc. _____ 0.948.
Impact strength (by falling
 ball method) _____ >72 inches.
Tensile, p.s.i. _____ 3597.
Elongation, percent _____ 166.
Inherent viscosity _____ 2.829.
Molecular weight (based on
 inherent viscosity) _____ 69,170.
Melt index _____ Could not be determined, indicating a molecular weight of about 70,000 or higher.
Color _____ White after molding.

When a sample is bent 180 degrees, there is no crease formed.

The titanium butoxide used in this and succeeding examples was a colorless liquid with a melting point below −40° C., which was obtained from E. I. du Pont de Nemours and Company, Wilmington, Delaware. The ethylene used in this and succeeding examples was obtained from the Matheson Company, Inc., of Joliet, Illinois, and had a purity of 99.5 weight percent.

The mixture of diethylaluminum chloride and ethylaluminum dichloride was prepared by placing 150 grams of aluminum shavings in a flask fitted with a reflux condenser and heated to about 70° C. A trace of iodine was added to the flask to act as a catalyst and ethyl chloride was charged to the flask in liquid phase. The temperature of the reaction mixture was maintained in the range of 120 to 150° C. during the addition of ethyl chloride and the reaction mixture was maintained under a nitrogen atmosphere. When substantially all of the aluminum shavings had reacted with the ethyl chloride, the liquid product was removed from the flask and fractionally distilled at 4.5 millimeters mercury pressure in a packed distillation column. As set forth above, 3 cubic centimeters of the distillate, boiling at 72 to 74° C. at 4.5 millimeters mercury pressure, was used in the catalyst composition of Example I. This fraction boiling at 72 to 74° C. was analyzed and was found to contain 47.4 weight percent chlorine. The theoretical chlorine content for an equimolar mixture of diethylaluminum chloride and ethylaluminum dichloride is 43 weight percent.

EXAMPLE II

Ethylene was polymerized in a 1200 cubic centimeter stainless steel rocking autoclave in the presence of a catalyst consisting of 1 cubic centimeter of titanium butoxide and 3 cubic centimeters of a mixture of diethylaluminum chloride and ethylaluminum dichloride. This latter mixture was prepared according to the procedure described in Example I. The autoclave was charged with 200 cubic centimeters of cyclohexane (dried over sodium and distilled) prior to addition of the catalyst components. The reactor was flushed with dry nitrogen prior to and during the charging procedure to prevent contact of the catalyst with air or moisture. The ethylene was passed through a purification system to remove oxygen, carbon dioxide and water vapor prior to entering the reactor. The purification system comprised a pyrogallol solution, a sodium hydroxide solution and drying agents.

After charging the cyclohexane and the catalyst to the reactor in the order named, 10 cubic centimeters of 1-hexene (pure grade 99 mol percent) was added. With the temperature of the reactor and contents at 75° F., ethylene was added until a pressure of about 400 p.s.i.g. was reached. Heating of the reactor was initiated and after 1 hour and 35 minutes a temperature of about 162° F. and a pressure of 520 p.s.i.g. had been reached. After an additional 1 hour and 20 minutes, the temperature had increased to 240° F. and the pressure had dropped to 380 p.s.i.g. At this point the reactor was repressured with ethylene to 740 p.s.i.g. Fifty-one minutes later the temperature had increased to 267° F. and the pressure had decreased to 720 p.s.i.g. At this point heating was discontinued and the reactor allowed to cool gradually overnight. The following day the ethylene was vented from the reactor, and the reaction mixture together with methanol was charged to a Waring Blendor. The polymer was tough and was difficult to grind in the Waring Blendor. The polymer was subdivided to some extent and was then separated from the liquid by filtration. The ethylene polymer was then dried in a vacuum oven at about 80° C. and a pressure of less than 10 mm. of mercury. About 47 grams of dry polymeric material was recovered.

The physical properties of a compression molded sample of the product are presented in Table II.

Table II

| | |
|---|---|
| Density, grams/cc. | 0.939 |
| Melting point, ° F. | 241±3 |
| Flexibility | Good |
| Impact strength (by falling ball method) inches | >72 |
| Appearance | Clear |

EXAMPLE III

Ethylene was polymerized in a 2700 cubic centimeter stainless steel rocking autoclave in the presence of a catalyst consisting of 1 gram of a 59 weight percent solution of triethanolamine titanate in isopropyl alcohol and 3 cubic centimeters of a mixture of diethylaluminum chloride and ethylaluminum dichloride. This latter mixture was prepared according to the procedure described in Example I. The autoclave was charged with 500 cubic centimeters of benzene (distilled from sodium) prior to the addition of the catalyst components. The reaction vessel was flushed with nitrogen prior to and during the charging procedure to prevent contact of the catalyst with air or moisture. The ethylene feed was passed through a purification system comprising a pyrogallol solution, a sodium hydroxide solution and drying agents to remove oxygen, carbon dioxide and water vapor prior to entering the reactor.

With the autoclave and contents at about 75° F., ethylene was added until a pressure of about 300 p.s.i.g. was reached. The reactor was then heated gradually for a period of 49 minutes, at the end of which time the temperature had increased to 168° F. and the pressure had increased to about 325 p.s.i.g. It appeared that polymerization of the ethylene had been initiated, and the heating was, therefore, discontinued at this point. The reaction was allowed to continue for an additional 20 minutes, at the end of which time the temperature had increased to about 199° F. and the pressure was about 325 p.s.i.g. At the end of an additional 1 hour reaction period, the temperature had dropped to 195° F., and at this point the reactor was repressured with ethylene to about 400 p.s.i.g. After an additional 29 minute reaction time, the temperature had decreased to about 183° F., and the pressure had dropped to about 325 p.s.i.g. At this point the run was terminated, and the reactor was removed from the rocker and cooled with water to room temperature. Ethylene was vented, and the reaction mixture together with methyl alcohol was placed in a Waring Blendor. After the polymer was finely subdivided, the mixture was removed from the Waring Blendor, and the solid was separated from the liquid. After drying the polymer at about 75° C. in a vacuum oven at a pressure of less than 10 mm. of mercury, approximately 55 grams of a white, finely divided polymer of ethylene was obtained.

The physical properties of a compression molded sample of the ethylene polymer are presented in Table III.

Table III

| | |
|---|---|
| Melting point, ° F. | 251±2. |
| Density, grams/cc. | 0.975. |
| Impact strength (by falling ball method) | Broke at 18 inches. |
| Melt index | 5.944. |
| Molecular weight (based on melt index) | 29,900. |

The triethanolamine titanate was obtained from the Titanium Pigment Corporation, 111 Broadway, New York, New York, and was identified at TT–237. The sample used in this example was a 59 weight percent solution of triethanolamine titanate in isopropyl alcohol, having a total titanium content expressed as $TiO_2$ of about 14.5 weight percent. This material is a yellowish liquid of Gardner color 10, and the density of the solution is 1.053 grams/cc. at 25° C. The viscosity of the solution is 88 centipoises at 25° C., and the refractive index ($n_D^{25}$) of the solution is 1.48.

EXAMPLE IV

The polymerization of styrene was carried out under atmospheric pressure in a 4-neck round bottom flask of one liter capacity. The flask was fitted with a stirrer, water condenser, nitrogen inlet, and a dropping funnel. The reaction was carried out in a nitrogen atmosphere maintained during the charging procedure and also during the polymerization.

After addition of about 250 cubic centimeters of benzene (distilled over sodium) to the 4-neck flask 0.5 cubic centimeter of titanium butoxide (Du Pont) and 2 cubic centimeters of a mixture of ethylaluminum dichloride and diethylaluminum chloride were charged. This latter mixture was prepared according to the procedure described in Example I. The solution of the catalyst components in the benzene became yellow and after about 10 minutes had turned dark brown. The mixture was stirred for approximately 20 minutes without any apparent evolution of heat.

At the end of the stirring period about 100 cubic centimeters (90.7 grams) of freshly distilled styrene (obtained from Koppers Company, Inc., of Pittsburgh, Pennsylvania) was added over a period of about 5 to 10 minutes. The solution turned dark brown and it was noted that some heat was evolved. The reaction mixture was stirred for about 30 minutes at room temperature. The mixture was subsequently heated until refluxing was initiated and the polymerization was continued at reflux conditions for about 22 hours.

At the end of this period 5 milliliters of methyl alcohol was added and the solution turned a straw yellow color. About 100 milliliters of dry benzene was then added and the mixture was filtered to remove the greenish-black inorganic material which was present in the reaction mixture. The straw-colored filtrate was added to about 2 liters of methyl alcohol. The polymer which precipitated was somewhat fibrous in nature and easily filtered. After filtration the product was air dried, yielding about 89 grams of polystyrene. The polymer had an initial melting or softening point at about 75° C. and continued to melt over a range up to about 125° C.

The polymers and copolymers produced in accordance with this invention have utility in applications where solid plastics are used. They can be molded to form articles of any desired shape, such as bottles and other containers for liquids. Also, they can be formed into pipe by extrusion.

As will be evident to those skilled in the art, many variations and modifications can be practiced within the scope of the disclosure and claims of this invention. The invention resides in an improved polymerization process for olefins as described herein comprising the use of a novel catalyst composition and the polymers so produced, said catalyst composition comprising an organometal halide corresponding to the formula $R'_xM'X'_y$, wherein R' is at least one member selected from the group consisting of saturated acyclic hydrocarbon radicals, saturated cyclic hydrocarbon radicals, and aromatic radicals, wherein M' is a metal selected from the group consisting of aluminum, gallium, indium, thallium, and beryllium, wherein X' is a halogen, and wherein $x$ and $y$ are integers, the sum of $x$ and $y$ being equal to the valence of said metal.

We claim:

1. In the polymerization of at least one aliphatic $C_2$–$C_{10}$ α-monoolefin to form solid polymer, the improvement which comprises effecting the polymerization at 20–130° C. in the presence of a catalytic mixture of a tetraalkyl orthotitanate wherein each alkyl group contains 8–13 carbon atoms and alkyl aluminum halide wherein each alkyl group contains 2–12 carbon atoms.

2. In the polymerization of at least one aliphatic $C_2$–$C_{10}$ α-monoolefin to form solid polymer, the improvement which comprises effecting the polymerization at 20–130° C. in solution in an inert organic liquid in the presence of a catalytic mixture of a tetraalkyl orthotitanate wherein each alkyl group contains 8–13 carbon atoms and a dialkyl aluminum monohalide wherein each alkyl group contains 2–12 carbon atoms.

3. In the polymerization of at least one aliphatic $C_2$–$C_{10}$ α-monoolefin to form solid polymer, the improvement which comprises effecting the polymerization at 20–130° C. in solution in an inert organic liquid in the presence of a catalytic mixture of a tetraalkyl orthotitanate wherein each alkyl group contains 8–13 carbon atoms and a monoalkyl aluminum dihalide wherein each alkyl group contains 2–12 carbon atoms.

4. In the polymerization of at least one aliphatic $C_2$–$C_{10}$ α-monoolefin to form solid polymer, the improvement which comprises effecting the polymerization at 20–130° C. in solution in an inert organic liquid in the presence of a catalytic mixture of a tetraalkyl orthotitanate wherein each alkyl group contains 8–13 carbon atoms and an alkyl aluminum sesquihalide wherein each alkyl group contains 2–12 carbon atoms.

5. In the polymerization of at least one normally gaseous α-monoolefin from the group consisting of ethylene and propylene to form solid polymer, the improvement which comprises effecting the polymerization in solution in an inert organic liquid at a temperature of 20–130° C. and in the presence of a catalytic mixture of tetraalkyl orthotitanate wherein each alkyl group contains 8–13 carbon atoms and an alkylaluminum halide wherein each alkyl group contains 2–12 carbon atoms, the molar ratio of said alkyl aluminum halide to said tetraalkyl orthotitanate being in the range of from 1:4 to 32:1.

6. In the polymerization of α-monoolefinic hydrocarbon material from the group consisting of ethylene and propylene to form solid polymer, the improvement which comprises catalyzing the polymerization with a catalytic mixture in a molar ratio of from 1:4 to 4:1 of a titanium tetraalkoxide wherein each alkoxide group contains 1–4 carbon atoms and a monoalkyl aluminum dihalide wherein the alkyl group contains 1–12 carbon atoms and the halogen atoms are from the group consisting of chlorine and bromine, and thereby forming a solid high molecular weight polymer of improved color.

7. In the polymerization of at least one monoolefin from the group consisting of ethylene and propylene to form solid polymer, the improvement which comprises polymerizing said monoolefin at a temperature of from 0 to 200° C. in liquid dispersion in an inert organic liquid and in the presence of 0.1–4% by weight based on said liquid of a catalytic mixture in a molar ratio of from 1:4 to 4:1 of titanium tetrabutoxide and monoalkyl aluminum dichloride wherein the alkyl group contains 1–12 carbon atoms, and thereby forming a solid high molecular weight polymer of improved color.

8. In the polymerization of at least one monoolefin from the group consisting of ethylene and propylene to form solid polymer, the improvement which comprises polymerizing said monoolefin at a temperature of from 0° to 200° C. in liquid dispersion in an inert organic liquid and in the presence of 0.1–4% by weight based on said liquid of a catalytic mixture in a molar ratio of from 1:4 to 4:1 of titanium tetrabutoxide and monoalkyl alumnium dibromide wherein the alkyl group contains 1–12 carbon atoms, and thereby forming a solid high molecular weight polymer of improved color.

9. The process which comprises progressively introducing into a polymerization zone a polymerization mixture of substantially constant composition comprising an inert organic liquid vehicle, α-monoolefinic hydrocarbon material from the group consisting of ethylene and propylene in a concentration soluble in said vehicle, and from 0.1 to 4% by weight based on said vehicle of a catalytic mixture in a molar ratio of from 1:4 to 4:1 of a titanium tetraalkoxide wherein each alkoxide group contains 1–4 carbon atoms and a monoalkyl aluminum dihalide wherein the alkyl group contains 1–4 carbon atoms and the halogen atoms are from the group consisting of chlorine and bromine, maintaining said polymerization mixture in said zone in liquid dispersion at a substantially constant temperature in the range of from 0° C. to 200° C. and for a time sufficient for substantial formation of solid polymer, and progressively withdrawing the resulting mixture from said zone in amounts correlated to the introduction of said polymerization mixture whereby the relative proportions of the various components in said zone remain substantially unchanged during the process.

10. The process which comprises progressively and continuously introducing into a polymerization zone at a substantially constant rate a polymerization mixture of substantially uniform composition comprising an inert liquid hydrocarbon vehicle, at least one monoolefin from the group consisting of ethylene and propylene in a concentration soluble in said vehicle and from 0.1 to 4% by weight based on said vehicle of a catalytic mixture of a titanium tetraalkoxide wherein each alkoxide group contains 1–4 carbon atoms and a monoalkyl aluminum dihalide wherein the alkyl group contains 1–12 carbon atoms and the halogen atoms are from the group consisting of chlorine and bromine, the molar ratio of said titanium tetraalkoxide to said monoalkyl aluminum dihalide being in the range of from 1:4 to 4:1, maintaining said polymerization mixture in said zone in liquid dispersion at a substantially constant temperature in the range of from 25° C. to 130° C. and for a time sufficient for substantial formation of solid polymer, and progressively and continuously withdrawing the resulting mixture from said zone at a substantially constant rate equivalent to the rate of introduction of said polmerization mixture whereby the relative proportions of the various components in said zone remain substantially unchanged during said process.

11. In the polymerization of α-monoolefinic hydrocarbon material from the group consisting of ethylene and propylene to form solid polymer, the improvement which comprises catalyzing the polymerization with a catalytic mixture in a molar ratio of from 1:4 to 4:1 of a titanium tetraalkoxide wherein each alkoxide group contains 1–13 carbon atoms and a monoalkyl aluminum dihalide wherein the alkyl group contains 1–12 carbon atoms and the halogen atoms are from the group consisting of chlorine and bromine, and thereby forming a solid polymer.

12. The process of claim 6 wherein said titanium tetraalkoxide is titanium tetrabutoxide and said monoalkylaluminum dihalide is ethylaluminum dichloride.

13. As a catalyst for polymerization of normally gaseous α-monoolefins, a mixture in a molar ratio of from 1:4 to 32:1 of at least one alkyl aluminum halide from the group consisting of dialkyl aluminum monohalides and monoalkyl aluminum dihalides wherein each alkyl group contains 2–12 carbon atoms and a tetraalkyl orthotitanate wherein each alkyl group contains 8–13 carbon atoms.

References Cited by the Examiner

UNITED STATES PATENTS

| | | | |
|---|---|---|---|
| 2,721,189 | 10/1955 | Anderson | 260—94.9 |
| 2,822,357 | 2/1958 | Brebner et al. | 260—94.9 |
| 2,838,477 | 6/1958 | Roelen et al. | 260—94.9 |
| 2,862,917 | 12/1958 | Anderson et al. | 260—94.9 |
| 2,905,645 | 9/1959 | Anderson et al. | 260—94.9 |
| 3,050,471 | 8/1962 | Anderson et al. | 260—94.9 |
| 3,113,115 | 12/1963 | Ziegler et al. | 260—94.9 |

FOREIGN PATENTS

| | | |
|---|---|---|
| 533,362 | 5/1955 | Belgium. |
| 534,792 | 5/1955 | Belgium. |
| 534,888 | 1/1955 | Belgium. |
| 874,215 | 4/1953 | Germany. |

JOSEPH L. SCHOFER, *Primary Examiner.*

W. G. BENGEL, A. M. BOETTCHER, LEON ZITVER, B. E. LANHAM, MORRIS LIEBMAN, *Examiners.*